US006933264B2

(12) United States Patent
Petelot

(10) Patent No.: US 6,933,264 B2
(45) Date of Patent: Aug. 23, 2005

(54) THREADED COMPONENT FOR SEIZURE-RESISTANT TUBULAR THREADED JOINT

(75) Inventor: Daniel Petelot, Taisnieres en Thierache (FR)

(73) Assignees: Vallourec Mannesmann Oil & Gas France, Aulnoye-Aymeries (FR); Condat S.A., Chasse-sure-Rhone (FR)

( * ) Notice: Subject to any disclaimer, the term of this patent is extended or adjusted under 35 U.S.C. 154(b) by 197 days.

(21) Appl. No.: 10/111,988

(22) PCT Filed: Aug. 9, 2001

(86) PCT No.: PCT/FR01/02588
§ 371 (c)(1), (2), (4) Date: Apr. 30, 2002

(87) PCT Pub. No.: WO02/18522
PCT Pub. Date: Mar. 7, 2002

(65) Prior Publication Data
US 2003/0144158 A1 Jul. 31, 2003

(30) Foreign Application Priority Data
Aug. 31, 2000 (FR) .......................................... 00 11127

(51) Int. Cl.⁷ ................................................ F16N 1/00
(52) U.S. Cl. ........................ 508/318; 508/312; 508/319; 508/391; 508/589; 285/94; 285/333; 285/355
(58) Field of Search ................................ 508/312, 318, 508/319, 391, 589; 285/94, 333, 355

(56) References Cited

U.S. PATENT DOCUMENTS

| 2,065,247 A | | 12/1936 | Smith | |
| 2,419,144 A | | 4/1947 | Kelly | |
| 3,095,375 A | | 6/1963 | Pitman | |
| 3,526,593 A | | 9/1970 | Oliver, Jr. | |
| 3,652,414 A | * | 3/1972 | Bergeron | 508/119 |
| 4,379,062 A | * | 4/1983 | Prengaman | 508/139 |
| 4,414,247 A | | 11/1983 | Huebecker et al. | |
| 5,275,845 A | | 1/1994 | Krings et al. | |
| 5,536,422 A | * | 7/1996 | Oldiges et al. | 508/121 |
| 6,063,742 A | * | 5/2000 | Konzman | 508/368 |

FOREIGN PATENT DOCUMENTS

| FR | 2 597 117 | 10/1987 |
| GB | 1 033 735 | 6/1966 |
| GB | 1 086 720 | 10/1967 |
| WO | 93 06197 | 4/1993 |

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

The invention concerns a threaded component for a seizure-resistant tubular threaded joint wherein a lubricating substance is deposited in a thin film on at least the surface of the threads of the threading, said surface being treated to adsorb said lubricating substance. The lubricating substance consists of a homogeneous mixture of a) a thickening agent; b) a set of extreme-pressure additives physically and chemically compatible with the thickening agent and comprising at least an extreme-pressure additive with chemical action called chemical EP additive and capable of being used at Hertz pressures not less than 1000 Mpa's; c) an oil. The proportions of the constituents of the lubricating substance are selected such that said lubricating substance has a consistency capable of ensuring a self-induced and film-forming lubricating process. The invention also concerns a method for producing the thin film.

43 Claims, 7 Drawing Sheets

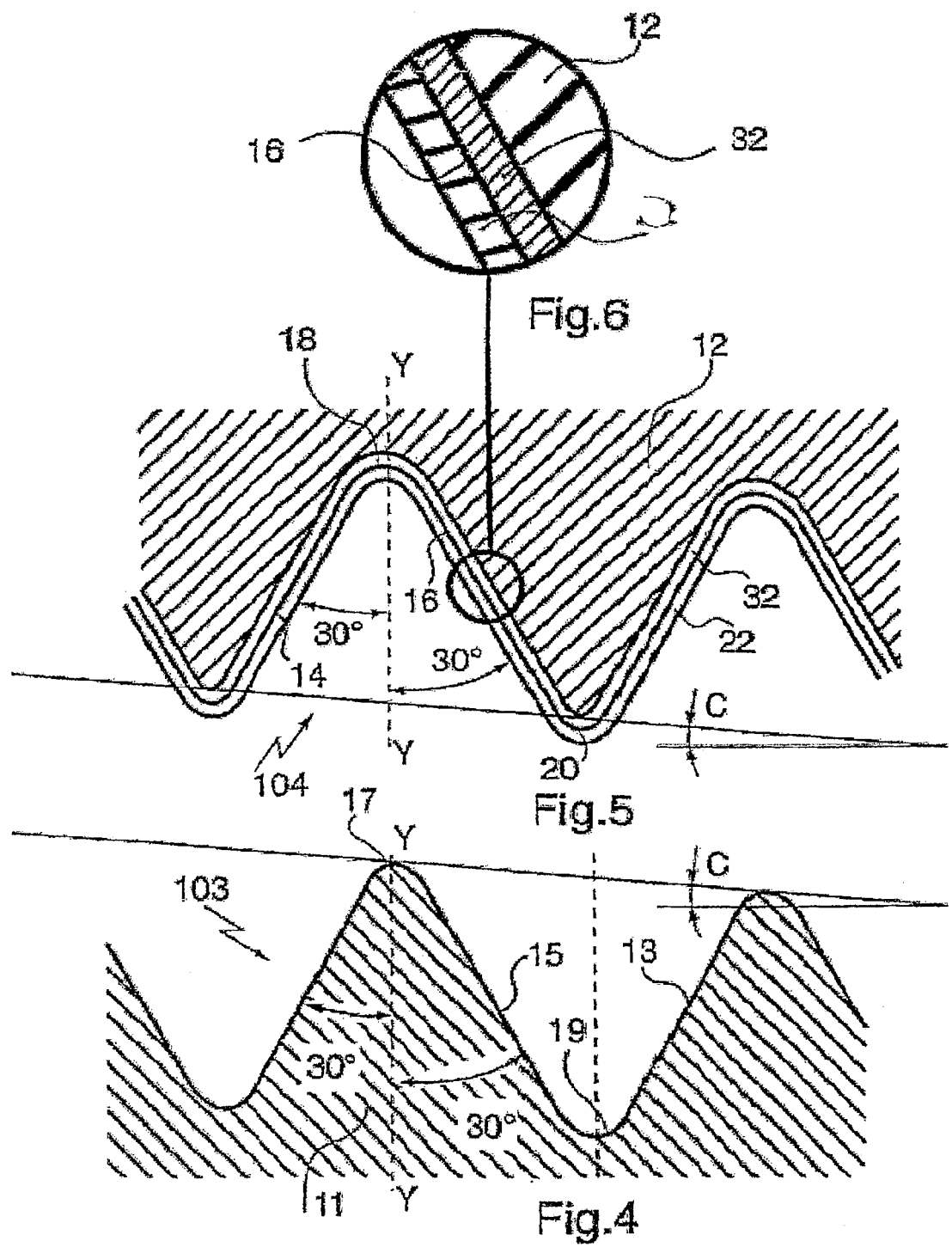

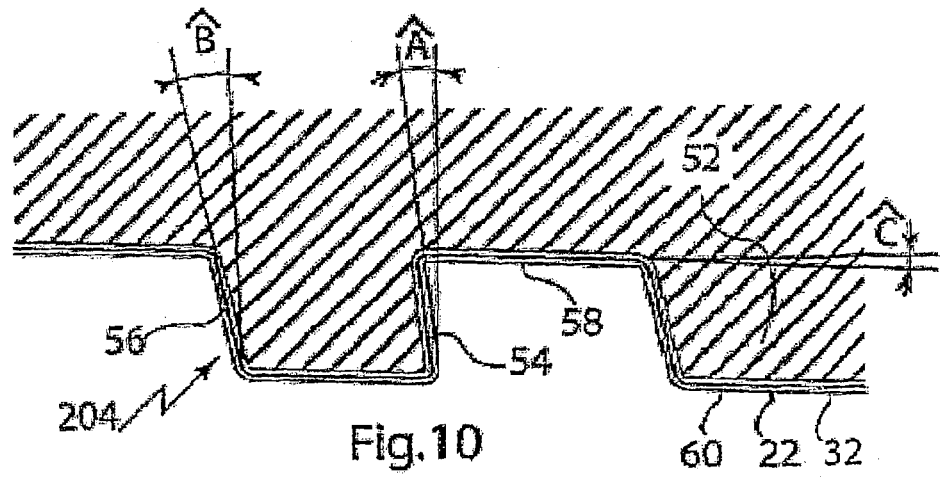
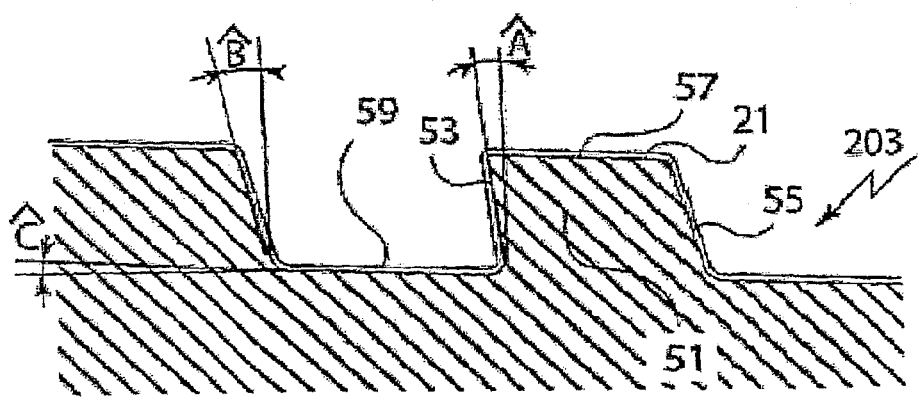
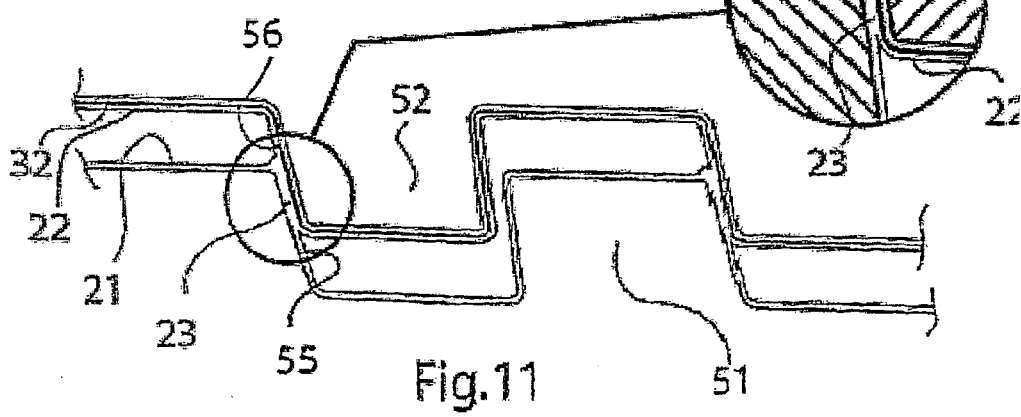

THREADED COMPONENT FOR SEIZURE-RESISTANT TUBULAR THREADED JOINT

The present invention relates to male or female elements disposed at the end of pipes and intended to be connected by making up to constitute galling-resistant threaded tubular connections and more particularly those intended for making up without the manual addition of grease.

Such threaded elements and threaded tubular connections are known to be used in particular to constitute casing strings or production strings or drillpipe strings for hydrocarbon wells or the like, such as for instance geothermal wells.

Such types of pipes are generally made up vertically, the free end of the string at the surface comprising a female threaded element with an internal female threading.

In order to lower the string into the well, a new pipe is provided above the string provided with a male threaded element comprising an external male threading corresponding to the female threading at the corresponding free end of the string, the male threading of the new pipe is engaged in the corresponding female threading of the string and the new pipe is made up until the makeup torque reaches a given value or a given reference. The string can then be lowered by the length of the pipe that has been connected and the process is repeated.

Because of the length of the pipes, about 10 m, it is not easy to engage the new pipe perfectly co-axially with the top of the string. Thus, the threadings suffer enormously during connection and more particularly, the stabbing flanks of the male and female threads which rest against each other during engagement and are in sliding contact for a large proportion of makeup. The stabbing flanks of the threads are thus highly sensitive to the phenomenon of galling that can occur, if not during the first makeup at least during the subsequent makeup procedures, a threaded tubular connection having to be capable of being made up and broken out many times without galling.

Galling can also occur at "metal-metal" sealing surfaces present on the threaded elements of the threaded tubular connections known as "premium" connections, such sealing surfaces being in sliding contact under increasing contact pressure up to the final makeup position.

This is also the case for the abutment surfaces, which come into contact at the end of makeup.

Therefore it is out of the question to constitute purely metal-metal sliding contact surfaces both for the threadings and for the sealing surfaces or the abutments if the threaded connection is provided therewith, since the constitution of such surfaces would inevitably cause galling, which is unacceptable.

The conventional solution, which has been employed for many years, is to interpose a grease between the metallic surfaces that are in sliding contact, that grease being applied to the threaded element in batches.

The most widely used grease is API type 5A2 or 5A3 grease specified by the American Petroleum Institute (API) which is a heterogeneous mixture of a grease, graphite particles and Pb, Zn and Cu metals which has both anti-galling properties and fills the clearance between the male and female threads.

Such a grease, however, suffers from a number of disadvantages.

The first disadvantage of API grease linked to its nature is its amount in lead, an element that is particularly noxious to health and to the environment.

Such a grease also has other disadvantages, some of which are common to all greases.

Because of those characteristics, the grease is generally applied with a brush to the contact surfaces of the threaded elements. Care is taken that a minimum quantity of grease, measured by a minimum volume or minimum mass, is applied to the surfaces: thus Vallourec Mannesmann Oil & Gas France, in its booklet "VAM® Running Book", produced by the company in July 1996 for its clients, specifies a volume of at least 25 cm$^3$ or a mass of at least 42 g of API Bul 5A2 grease to coat the contact surfaces of male and female elements of VAM® TOP threaded connections with a 7" (177.8 mm) external diameter.

This results in a certain variability in the quantities of grease applied to the threaded elements:

a) According to the operators in charge of the grease coating operation, in particular on site;

b) for the same operator, from one threaded element to another; and c) for the same threaded element, from one point on the threaded element to another.

The makeup operation distributes the grease in the clearances between the male threads and corresponding female threads, these clearances varying in a random manner from one threaded connection to another due to the manufacturing tolerances for the threaded elements, and leads to ejection of surplus grease from the threaded connection.

For certain types of threaded connections, the difficulty in evacuating surplus grease may result in the production of very high pressures on the threads during makeup that may alter the measurement of the makeup torque, or even deform the threads and the sealing surfaces, even with tapered threadings (recommended by the API and thus widely used) and lead in the event of excessive application to the threadings jumping out, with a catastrophic drop of the string to the bottom of the well.

In addition, surplus grease ejected during makeup accumulates at the bottom of the well in large amounts taking into account the number of threaded connections used, and block the pores of the reservoir rock, which pores must be traversed by the hydrocarbons before being recovered by the production pipes. Such a blocking considerably affects the exploitation costs of hydrocarbon wells.

Further still, certain greases, including API 5A2 or 5A3, do not offer sufficient anticorrosion protection because of their composition and the conditions and duration of transport and/or storage of the pipes before use.

It may then be necessary at the manufacturing factory to apply a grease that is specific for transport and storage to the contact surfaces of the threaded elements, then to eliminate it on site just before connecting the pipes and then to apply a final API 5A2 type grease for makeup.

A number of other types of grease, with or without lead, have been described in patents concerning threaded connections.

Such greases are often heterogeneous, being charged with metallic particles, mineral particles or thermoplastic particles to fill the clearances between the male and female threads (GB 1 086 720, U.S. Pat. No. 3,526,593) and/or to prevent galling during makeup (U.S. Pat. Nos. 2,065,247, 5,275,845) or on breakout (GB 1 033 735, U.S. Pat. No. 2,419,144).

The anti-galling properties of certain of the greases described in those patents may result from the presence of extreme pressure additives in those greases, which act chemically: U.S. Pat. Nos. 2,065,247, 3,095,375.

However, those patents concern greases which as a result possess the disadvantages of all of the greases indicated above for API 5A2 or 5A3 greases.

Coatings with a solid consistency applied by the pipe manufacturer to the threads and bearing surfaces were then developed, enabling "dry" makeup of threaded connections without the need for subsequent application of lubricant on site.

Such coatings may be metallic in nature, such as those described in European patent EP 632 225, which employ an external layer of lead, or based on metallic oxides such as those described in EP 500 482, which employ an external layer of lead oxide, however those coatings involve the undesirable presence of lead or lead compounds.

Such coatings can also be a paint or a sliding varnish.

Patent application EP 786 616 describes a method for producing such a sliding varnish on a threaded element, which method comprises prior deposit of a thin layer (0.005 to 0.030 mm) of phosphate then a 0.010 to 0.045 mm thick layer of a mixture of an epoxy type synthetic resin or of another type and molybdenum disulfide or tungsten disulfide and polymerizing the resin by heating.

U.S. Pat. No. 4,414,247 also describes a similar method for producing a sliding varnish on a threaded element.

Such sliding varnishes have excellent anti-galling properties as long as they are present. However as solid varnishes, they wear and are not regenerated during repeated makeup-breakout operations. Thus, after several makeup-breakout operations galling is observed on threaded connections provided with such coatings, said galling being then sudden and catastrophic.

Further, if such a sliding varnish becomes locally deteriorated during pipe transport or storage, the varnish layer cannot be repaired locally.

The present invention seeks to obtain a male or female threaded element for a threaded tubular connection that is particularly resistant to galling, comprising a male or female threading depending on the type of threaded element which, being provided with a lubricating layer on the surfaces intended to become contact surfaces, is free of the disadvantages cited above.

In particular, the invention seeks to provide a threaded element that can be made up or broken out 10 times with a threaded element of the mating type without causing galling under severe hydrocarbon well exploitation conditions with Hertz pressures that can be employed that may be more than 300 MPa between the sliding contact surfaces, with sliding velocities of 0.1 µm/s and with slide lengths of up to one meter.

The invention also seeks to avoid catastrophic galling leading suddenly to an unacceptable degradation in the contact surfaces and necessitating discarding or re-machining the threaded elements.

Still further, the invention seeks to provide a threaded element that does not liberate any substances that are dangerous to the environment such as lead or heavy metals for example.

Yet still further, the invention seeks to provide a threaded element that can be used with the same success both in arctic regions and in tropical or equatorial regions and after periods at the bottom of wells, where the temperatures can reach or even exceed 160° C.

Still further, the invention seeks to provide a threaded element that can normally be used on the drill site or production site without applying lubricant at that time, the necessary lubricant having already been applied at the factory producing the threaded element.

Yet still further, the invention seeks to ensure that the portions of the threaded element intended to come into sliding contact during makeup and coated with lubricant at the factory cannot be corroded during transport and storage.

Yet still further, the invention seeks to ensure that the lubricant deposit produced at the factory can if necessary be repaired on site.

Of course, the invention seeks to ensure that the properties are obtained at a relatively low cost.

Further, the invention seeks to ensure that the threaded element can be used with success both with a mating threaded element in accordance with the invention and with a compatible commercially available mating threaded element.

Still further, the invention seeks to ensure that the same anti-galling properties is obtained with threaded elements comprising one or more "metal-metal" sealing surfaces and/or at least one makeup abutment in addition to a threading.

Yet still further, the invention seeks to ensure that the same anti-galling properties can be obtained with threaded elements for integral threaded tubular connections or for threaded and coupled connections, comprising all types of threadings (tapered, straight, single stage or with a plurality of stages, etc) with all types of thread shapes (triangular, trapezoidal, etc.) with a constant or varying thread width (wedge threads).

The invention provides a male or female threaded element comprising a male or female threading respectively, a lubricating substance being deposited in a thin layer at least on the surface of the threads of the threading, this surface being treated to adsorb or absorb said lubricating substance.

The term "thin layer of lubricating substance" means a layer with a thickness of less than 0.10 mm.

The lubricating substance used is a homogeneous mixture of:
 a) a thickening agent;
 b) at least one extreme pressure (EP) additive including at least one extreme pressure additive with a chemical action, termed a chemical EP additive; and
 c) an oil.

The term "homogeneous mixture" means, as is known, an intimate and stable dispersion of the constituents, such that the lubricating substance has identical properties at all points.

The proportions of the three components of the lubricating substance are selected so that said lubricating substance has a consistency able to ensure a self-fed lubrication regime and a film-forming nature.

The notion of a "self-fed lubrication regime" is known per se to characterize the fact that, in lubricating substances of the oil type and of certain greases, the layer of lubricating substance is never irreversibly destroyed but "self-heals" or "self-joins" as it is sheared off during makeup.

Such a characteristic can be achieved with a range of consistency for the lubricating substance at ambient temperature that is relatively wide, ranging from a semi-solid consistency similar to that of a highly viscous varnish prior to drying to a pasty consistency that does not flow and resembles a wax.

It is necessary to combine the three components of the lubricating substance, thickening agent, EP additive and oil, to solve the present problem. However, the lubricating substance can also comprise other substances, which are inert as regards the galling resistance, but are added for other reasons (to color the layer, for example).

The thickening agent, as its name implies, makes the lubricating substance thick, viscous, consistent, pasty but fluid to provide the self-fed lubricating regime and the film-forming properties. It can also act as a binder for the other constituents of the lubricating substance.

Two chemical families of thickening agent, organic and mineral, can be distinguished:
  a) organic thickening agents: non limiting examples of organic thickening agents that can be cited are animal or vegetable petroleum waxes, petrolatum waxes, oxidized petrolatum waxes, sulphonated waxes, synthetic waxes and mixtures of these waxes, tackifying petroleum resins, bitumens, polymers that are soluble or dispersible in oil, liposoluble soaps, etc. In addition to the properties cited above, this type of thickening agent can advantageously have a protective function as regards corrosion because of its chemical and physical characteristics.
  b) mineral thickening agents: the mineral thickening agent can be hydrophobic calcined silica, hydrophobic grafted bentonites or titanium dioxide.

Extreme pressure (EP) additives are substances that are well known in the lubricant field. Their performances can be measured by EP test standards (4 ball test, Falex test, etc.).

By definition, chemical EP additives react with metallic parts in contact from a certain temperature generated by friction, creating a chemical lubricating film. Among chemical EP additives the following ones are known:
  chemical EP additives based on sulfur or containing sulfur, such as for example hydrocarbons or sulfur-containing esters sold as a "sulfur-containing product", metallic dithiocarbamates, neutral or overbased metallic sulphonates;
  chemical EP additives based on phosphorus, such as phosphoric acids or esters;
  chemical EP additives based on sulfur and phosphorus, such as metallic dithiophosphates, in particular of zinc;
  chemical EP additives based on chlorine, in particular chlorinated paraffins;
  modified or non-modified fatty acids or esters, complex esters, etc.

These chemical EP additives are generally produced and sold diluted in a mineral oil, but the term "chemical EP additives" as used in the remainder of the present document will refer to the undiluted active ingredient.

The chemical EP additive or additives used are selected from known additives to allow operation without galling at a Hertz pressure of 1000 MPa or more.

They are also selected so as to be physically and chemically compatible with the selected thickening agent: they must, therefore, be perfectly miscible with the thickening agent but must not react with it as their extreme pressure properties would be severely diminished.

These chemical EP additives can be used alone or as a mixture to benefit from maximum synergy in performance.

The term "oil" as used in the lubricating substance means both an oil that is specifically added and an oil in which the thickening agents and/or EP additives, in particular chemical EP additives, are diluted when supplied.

The oil used can be a cut from distilling petroleum products known as "inorganic base", but it can also be a synthetic base obtained by chemical reaction such as polyalphaolefins, polyisobutenes, esters, etc. it can also be a vegetable based oil (rapeseed oil, sunflower oil, etc.) or an animal oil. It can also be a mixture of such bases.

Preferably, the chemical EP additive or additives and thickening agent are soluble in the oil, which enables to disperse the chemical EP additive or additives with the thickening agent and obtain a perfectly homogeneous lubricating substance.

Preferably, the thickening agent has chemical molecules with a marked polar nature. Such a feature can in particular make the lubricant adhere to a substrate.

Preferably, the thickening agent is chemically stable up to a temperature of 120° C. or more, preferably 160° C. or more.

Optionally, the EP additive or additives also comprise at least one EP additive with a physical action, preferably in the form of solid submicronic particles to produce the lubricating substance in the form of a homogeneous mixture.

EP additives with a physical action, known as physical EP additives, intercalate themselves between the contact surfaces in the form of a film that can shear along the characteristic cleavage planes of their crystalline structure and parallel to the plane of movement, or simply in readily deformable planes. The first category (cleavage) includes graphite, molybdenum, tungsten or tin disulfides, boron nitride, etc., and the second category includes PTFE, polyamide, polyurea type polymers, etc.

Preferably, at least one of the components from the assembly of EP additives has anticorrosion properties.

The total content of EP additives is preferably in the range 5% to 75% %, depending on the type of EP additive used.

In a first preferred implementation, the total content of EP additives is in the range 5% to 50% and highly preferably in the range 15% to 32% by weight.

Advantageously in this first implementation, the lubricating substance comprises a plurality of chemical EP additives, preferably non chlorinated additives.

In a first variation of the first implementation, the content of thickening agent in the lubricating substance is in the range 5% to 60% by weight and preferably in the range 8% to 40% by weight; this results in an oil content in the lubricating substance which is in the range 30% to 75% and preferably in the range 40% to 60% by weight.

In a second variation of the first implementation, enabling to have a more solid deposit consistency, the content of thickening agent in the lubricating substance is in the range 60% to 80% by weight; this results in an oil content in the lubricating substance in the range 5% to 20% by weight.

In a second preferred implementation in which the chemical EP additive or additives comprise a chlorinated paraffin, the content of thickening agent in the lubricating substance is in the range 25% to 60% by weight, and the total EP additive content in the lubricating substance is in the range 40% to 75%; this results in an oil content in the lubricating substance in the range 0.5% to 15% by weight.

The contents of thickening agent and EP additives given for the different compositions of the present document correspond to the contents of active substances of the indicated constituents.

Preferably, the weight of the layer of lubricating substance on the threaded element is in the range 0.1 $g/m^2$ to 40 $g/m^2$.

In a variation, the surface of the threads, treated to adsorb or absorb the lubricating substance, is the surface of a layer selected from the group formed by phosphatation layers, oxalation layers and metal layers.

In a variation, the surface of the threads is treated to endow it with a controlled roughness so as to adsorb or absorb the lubricating substance. Such a treatment can, for example, be sanding, shot blasting, etching or the like.

Preferably, the surface of the threading threads is treated to adsorb or absorb the lubricating substance over a depth in the range 0.003 mm to 0.080 mm.

Advantageously, the lubricating substance is also deposited on each sealing surface when the threaded element under consideration comprises such sealing surfaces.

Advantageously again, the lubricating substance is also deposited on each abutment surface when the threaded element under consideration comprises such abutments.

Advantageously again, all the surfaces on which the lubricating substance is intentionally deposited as a thin layer are surfaces that are treated to adsorb or absorb the lubricating substance.

The present invention also aims to protect a galling-resistant threaded tubular connection that comprises a male threaded element and a female threaded element, each provided with a corresponding threading, the threadings being made up one into the other during connection, in which at least one of the two threaded elements is a threaded element of the invention as described above.

In a variation of this threaded connection, only one of the two threaded elements is a threaded element of the invention as described above, the other threaded element comprising a thin layer of the lubricating substance defined above deposited directly on at least the surface of the threads.

The lubricating substance is a homogeneous mixture of:
  a) a thickening agent;
  b) at least one extreme pressure additive, the extreme pressure additive or additives being physically and chemically compatible with the thickening agent and comprising at least one extreme pressure additive with a chemical action, termed a chemical EP additive, that can be used at Hertz pressures of 1000 MPa or more; and
  c) an oil.

The term "directly deposited thin layer of lubricating substance" means that the surface of the threads under consideration has not been treated to adsorb or absorb the lubricating substance.

The present invention also aims to protect a method for producing a thin layer of a lubricating substance on a male or female threaded element for a galling-resistant threaded tubular connection as described above, the threaded element comprising a male or female threading respectively.

The method of the invention comprises the following steps:
  a) preparing a homogeneous liquid mixture comprising:
      a volatile solvent;
      a thickening agent;
      at least one extreme pressure additive, the extreme pressure additive or additives being physically or chemically compatible with the thickening agent and comprising at least one extreme pressure additive with a chemical action that can be used at Hertz pressures of 1000 MPa or more; and
      an oil;
  b) applying a thin layer of substantially uniform thickness of said liquid mixture at least to the surface of the threads of the threaded element; and
  c) evaporating off the solvent naturally or forcedly.

The term "volatile solvent" means any petroleum cut with distillation temperatures in the range 40° C. to 250° C. These volatile solvents include special gasolines, white spirits, burning oils, aromatic products such as benzene, toluene, xylene, etc.

Optionally, at least the surface of the threads of the threaded element is treated to adsorb or absorb the lubricating substance to be applied.

Preferably, the viscosity of the liquid mixture, measured by FORD n°4 cup, corresponds to a duration in the range 10 s to 30 s, preferably in the range 15 s to 25 s.

Preferably again, the layer of liquid mixture is applied by spraying.

As an alternative, it can be applied by any other means: immersion, painting, sprinkling.

The solvent can be evaporated off naturally or in a forced manner, in particular by moderate heating of the threaded element or by hot air convection.

The following figures provide non-limiting illustrations of a number of implementations of the invention.

FIG. 4 shows a few male threads of a male threaded tubular element of the commerce shown in FIG. 1.

FIG. 5 shows a few female threads of a female threaded tubular element of the invention of the type shown in FIG. 1.

FIG. 6 shows a detail of FIG. 5.

FIG. 9 shows a few male threads of a male threaded tubular element for a threaded tubular connection of the invention of the type shown in FIG. 2.

FIG. 10 shows a few female threads of a female threaded tubular connection of the type shown in FIG. 2.

FIG. 11 shows the stabbing phase at the beginning of make up of the male and female threads of FIGS. 9 and 10.

FIG. 12 shows a detail of FIG. 11.

Figure 1:
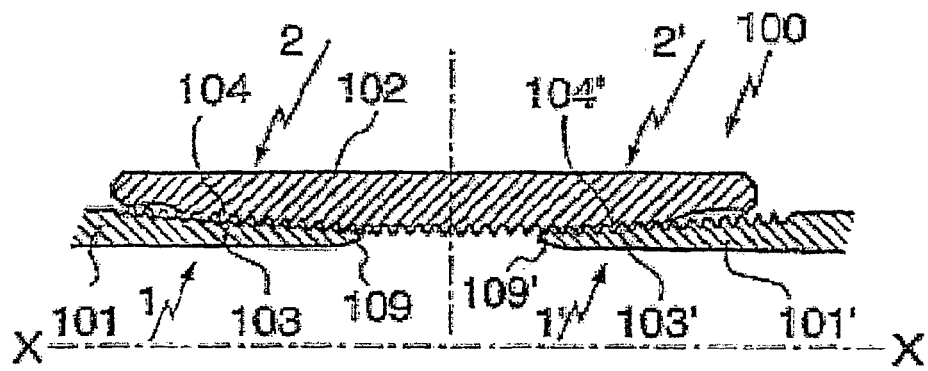
FIG. 1 shows a type of threaded and coupled connection comprising 4 threaded tubular elements that may be used by the invention.

FIG. 1 shows a threaded connection 100 in accordance with API specification 5CT between two metal pipes 101 and 101' using a coupling 102 and comprising 2 threaded connections.

Each end of pipe 101, 101' comprises a male element 1,1' comprising a male tapered threading 103, 103' with "round" threads and terminates in a male end surface 109, 109'.

Coupling 102 comprises 2 female elements 2, 2' symmetrically disposed with respect to the median plane of the coupling, each female element comprising a female tapered threading 104, 104' with threads that mate with the male threads.

Male threadings 103, 103' are made up into mating female threadings 104, 104'.

API specification 5B defines the thread shape, dimension, threading taper, pitch, etc for this type of connection.

Although not shown, a connection with "buttress" type threadings can also be used under API specification 5CT and 5B disposed in the same way as that of FIG. 1, but with trapezoidal threads.

Figure 2:
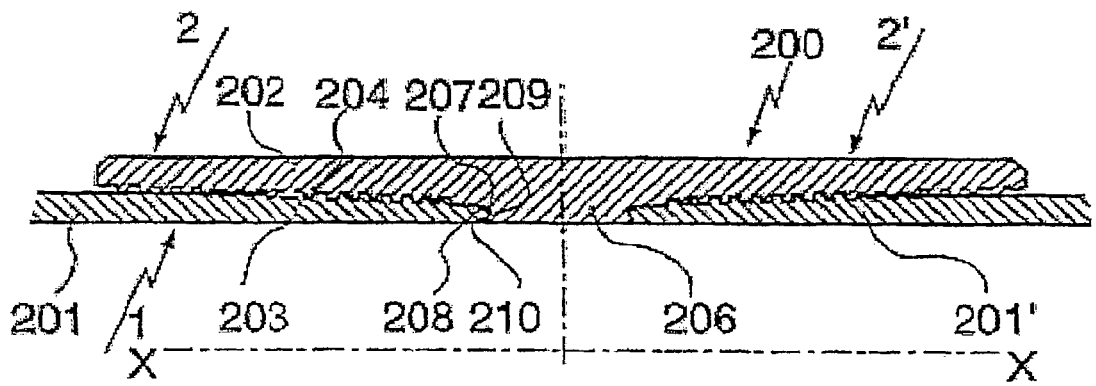
FIG. 2 shows a further type of threaded and coupled connection comprising 4 threaded tubular elements that may be used by the invention.

FIG. 2 shows a threaded and coupled connection 200 with two male elements 1,1' and two female elements 2,2' with tapered threadings 203, 204 and with trapezoidal threads, coupling 202 having a lug 206 in its central portion between the female elements, the lug enabling to make the fluid flow in a non turbulent way in pipes 201, 201', and to provide female abutments 210 which bear against the male abutments 209 constituted by the annular end surfaces of the pipes.

Tapered male and female sealing surfaces 207 and 208, disposed on the non threaded portions and radially interfering so as to produce an elastic contact pressure between them enable to provide a seal for the connection of FIG. 2 in known manner.

Figure 3:
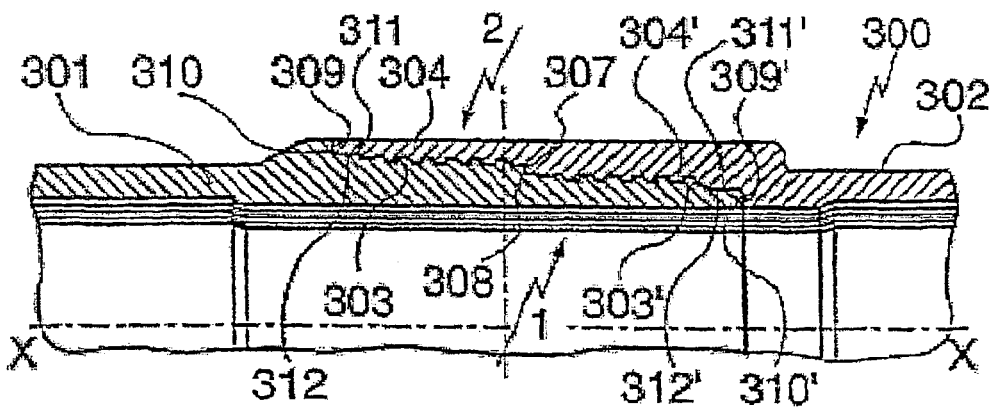
FIG. 3 shows an integral type threaded type connection comprising 2 threaded tubular connections that may be used by the invention.

FIG. 3 shows an integral threaded connection 300 between two pipes 301 and 302 comprising two-stage straight threadings.

The end of pipe 301 comprises a male element 1 comprising a straight two-stage male threading 303, 303', a tapered male shoulder surface 307 in a half dovetail between the two male thread stages and abutments 309, 309' at each end of the male element.

The end of pipe 302 comprises a female element 2 that mates with the male element 1 and comprises a straight two-stage female threading 304, 304', a tapered female shoulder surface 308 in a half dovetail between the two female thread stages, and abutments 310, 310' at each end of the female element.

The male and female threadings of coupling 300 have trapezoidal threads and normally have no radial interference after makeup.

In the connected state, shoulders 307, 308 form the principal abutment, abutments 309, 309', 310, 310' only acting as a backup abutment in case of sinking of the principal abutment.

Tapered surfaces 311', 312' on the male and female elements respectively form an internal pair of metal-metal sealing surfaces, in the vicinity of the end of the male element. In the vicinity of the end of the female element, the tapered surfaces 311, 312 form, an external pair of metal-metal sealing surfaces. The external pair of sealing surfaces 311, 312 could also be placed between shoulders 307, 308 and the large diameter threading stage 303, 304.

FIG. 4 shows a longitudinal section of a few triangular threads 11 of the male tapered threading 103 of FIG. 1.

Male threads 11 comprise two rectilinear flanks 13, 15 each making an angle of 30° with respect to the normal YY to axis XX of the threaded element and either side of that normal, a male rounded thread crest 17 and a male thread root 19, also rounded.

Flank 15, the normal to the surface of which is directed towards the free male end 109, is the flank known as the stabbing flank because the male stabbing flank rests on the female stabbing flank during engagement of the male and female threads for connection by makeup.

Flank 13, the normal to the surface of which is directed towards the side opposite the male free end 109, is the load flank. The load flanks support the axial tensile load on the threaded connections. Surfaces 13, 15 and zones 17, 19 of the male threads are as machined.

FIG. 5 shows a longitudinal section through a few triangular threads 12 of the female tapered threading 104 of FIG. 1.

The form of female threads 12 corresponds to the form of male threads 11, each with a stabbing flank 16 and a load flank 14, placed at 30° either side of the normal YY to the axis of the threaded element, a female thread crest 20 and a female thread root 18.

Surfaces 14, 16 and zones 18, 20 of the female threads are treated to absorb or adsorb a lubricating substance and to this end, comprise a layer 32 for conversion by manganese phosphatation with a thickness of 0.006 mm produced on the surfaces of the as machined thread. The manganese phosphatation layer is well suited to treating unalloyed or light alloy steel threaded elements.

Other phosphatation layers are also possible, such as a zinc phosphatation layer, for example.

In the case of steel threaded elements with a high chromium content or a nickel based alloy, it may be advisable to produce the layer by oxalation or by means of a deposit of copper metal.

The thickness desired for the different layers is of the same order of magnitude as that for the manganese phosphatation.

The treated surface of the female threads 12 is coated with a thin layer 22 of a lubricating substance that is partially adsorbed or absorbed into the phosphatation layer and which covers the latter by a thickness of a few microns in a substantially uniform manner over the treated surface of threads 12. The ratio between the weight of the adsorbed or absorbed layer in the phosphatation layer and the weight of the layer over the phosphatation layer is about 1/1.

The following compositions are examples of compositions (weight %) and of weight of layer ($g/m^2$) of suitable lubricating substance.

EXAMPLE 1

| | |
|---|---|
| petroleum paraffin wax: | 19% |
| sulfur-containing product: | 6% |
| overbased sulphonates: | 13% |
| metallic dithiophosphate: | 3% |
| mineral oil: | 59% |
| Weight of deposit: | 20 $g/m^2$ |

The lubricating substance comprises three chemical EP additives, namely the sulphur-containing product, the overbased sulphonates and the metallic dithiophosphate, which are oil-soluble constituents. The wax is also soluble in the oil.

EXAMPLE 2

| | |
|---|---|
| oxidized petrolatum wax: | 29% |
| sulfur-containing product: | 6% |
| overbased calcium sulphonates: | 13% |
| metallic dithiophosphate (Zn): | 3% |
| mineral oil: | 49% |
| Weight of deposit: | 20 $g/m^2$ |
| Kinematic viscosity of deposit at ±100° C. | 260 cSt |

It should be noted that oxidized petrolatum waxes are very temperature-stable compounds that are not deteriorated chemically when the temperature is maintained at 160° C. Such a chemical stability enables the threaded connections to be lowered to the bottom of wells where the temperature can reach 160° C. without irreversible changes in the characteristics of the wax; the threaded connections can then be raised from the well for breakout before being made up again and dropped again into the same well or into another well.

EXAMPLE 3

| | |
|---|---|
| petrolatum wax: | 31% |
| sulfur-containing product: | 6% |
| overbased sulphonates: | 13% |
| metallic dithiophosphate: | 3% |
| mineral oil: | 47% |
| Weight of deposit: | 24 g/m² |

EXAMPLE 4

| | |
|---|---|
| tackifying petroleum resin: | 30% |
| sulfur-containing product: | 6% |
| overbased sulphonates: | 13% |
| metallic dithiophosphate: | 3% |
| mineral oil: | 48% |
| Weight of deposit: | 21 g/m² |

EXAMPLE 5

| | |
|---|---|
| sulphonated wax: | 30% |
| sulfur-containing product: | 6% |
| overbased sulphonates: | 13% |
| metallic dithiophosphate: | 3% |
| mineral oil: | 48% |
| Weight of deposit: | 21 g/m² |

EXAMPLE 6

| | |
|---|---|
| bitumen: | 30% |
| sulfur-containing product: | 6% |
| overbased sulphonates: | 13% |
| metallic dithiophosphate: | 3% |
| mineral oil: | 48% |
| Weight of deposit: | 22 g/m² |

EXAMPLE 7

| | |
|---|---|
| aluminium stearate: | 30% |
| sulfur-containing product: | 6% |
| overbased sulphonates: | 13% |
| metallic dithiophosphate: | 3% |
| mineral oil: | 48% |
| Weight of deposit: | 23 g/m² |

EXAMPLE 8

| | |
|---|---|
| lipophilic bentonite: | 9% |
| sulfur-containing product: | 7% |
| overbased sulphonates: | 13% |
| metallic dithiophosphate: | 3% |

-continued

| | |
|---|---|
| mineral oil: | 68% |
| Weight of deposit: | 14 g/m² |

EXAMPLE 9

| | |
|---|---|
| polyalkylmethacrylate (organic thickening agent): | 12% |
| sulfur-containing product: | 6% |
| overbased sulphonates: | 12% |
| metallic dithiophosphate: | 4% |
| mineral oil: | 66% |
| Weight of deposit: | 23 g/m² |

EXAMPLE 10

| | |
|---|---|
| oxidized petrolatum wax: | 39% |
| polyisobutene | 2% |
| chlorinated paraffin: | 59% |
| Weight of deposit: | 21 g/m² |

In this Example 10, the chlorinated paraffin has an oily consistency; a small proportion of oil is added in the form of polyisobutene (synthetic base).

The use of chlorinated paraffin as a chemical EP additive renders this composition more particularly suitable for use with certain stainless steel threaded elements (not susceptible to corrosion by chlorine or chlorides) or nickel alloy threaded elements.

EXAMPLE 11

| | |
|---|---|
| oxidized petrolatum wax: | 67% |
| sulfur-containing product: | 5% |
| overbased calcium sulphonates: | 12% |
| metallic dithiophosphate (Zn): | 5% |
| mineral oil: | 11% |
| Weight of deposit: | 23 g/m² |
| Kinematic viscosity of deposit at +100° C.: | 560 cSt |

In all of the above examples, the deposits of lubricating substances obtained are smooth because of the film-forming nature of the lubricating substance and the liquid mixture from which it originates.

In all of the above examples except for Examples 5 and 9, the deposits of the lubricating substance obtained have a waxy, adhesive appearance, do not flow and thus have a pasty consistency at ambient temperature; by way of indication, the viscosity of such deposits is in the range 100 cSt to 1000 cSt at +100° C., the temperature that can be obtained when making up the threaded elements.

In the case of Examples 5 and 9, the appearance of the deposit is more that of a very viscous varnish and its consistency is semi-solid.

In all of the examples apart from Example 10, the lubricating substance comprises three chemical EP additives as the EP additive, the total content of EP additive being around 20–25%.

In Examples 1 to 9, the ratio between the sulfur-containing product, overbased sulphonates and metallic dithiophosphate is substantially 2:4:1. In Example 11, it is substantially 1:2:1.

The content of oil in the lubricating substance varies widely depending on the nature of the thickening agent and/or EP additives and the desired consistency:

about 50% for Examples 1 to 7;

about 65–70% for Examples 8 (thickening agent= lipophilic bentonite) and 9 (more flowing consistency);

about 10% for Example 11 (relatively solid waxy consistency);

only about 2% for Example 10 because of the oily consistency of the proportion of paraffin selected.

In all of the examples comprising an organic thickening agent, i.e., in all of the examples except for Example 8, the thickening agent contains chemical molecules with a marked polar nature, which allow it to adhere to the treated metallic surface of the threads and give it a hydrophobic nature. Such an adhesive hydrophobic nature allows the thin layer 22 of lubricating substance to perfectly cover the treated surface of the threads and to protect this surface against corrosion, in particular when the pipes are stored with their threaded elements prior to use.

All the compositions of these 11 examples produce a welding load in the ASTM D2596 "4 ball" test (EP test) of more than 800 kg and a wear mark diameter of 0.35 to 0.37 mm after 1 hour at 392 N (40 kgf) of load during ASTM D2266 wear tests.

All of the chemical EP additives of the 11 examples are physically and chemically compatible with the corresponding thickening agents. The chemical EP additives must remain stable until they are subjected to temperatures resulting from local rupture of the lubricating film and enabling those additives to then react chemically with the metallic surfaces in contact to form constituents preventing or delaying galling even when the contact pressure exceeds 1000 MPa.

In addition to a thickening agent, EP additives and an oil, the lubricating substance can optionally comprise less than 5% of a colorant having no action as regards the anti-galling properties but intended to indicate the presence of a thin layer of the lubricating substance of the invention (traceability and differentiation over standard API greases).

Thus the lubricating substance can comprise 2.5% of powdered carbon black to endow the lubricating substance with a highly homogeneous black color, or 0.12% of fluorescein (Fluorescent Green Light) to endow the lubricating substance with a dark green color.

Figure 7:
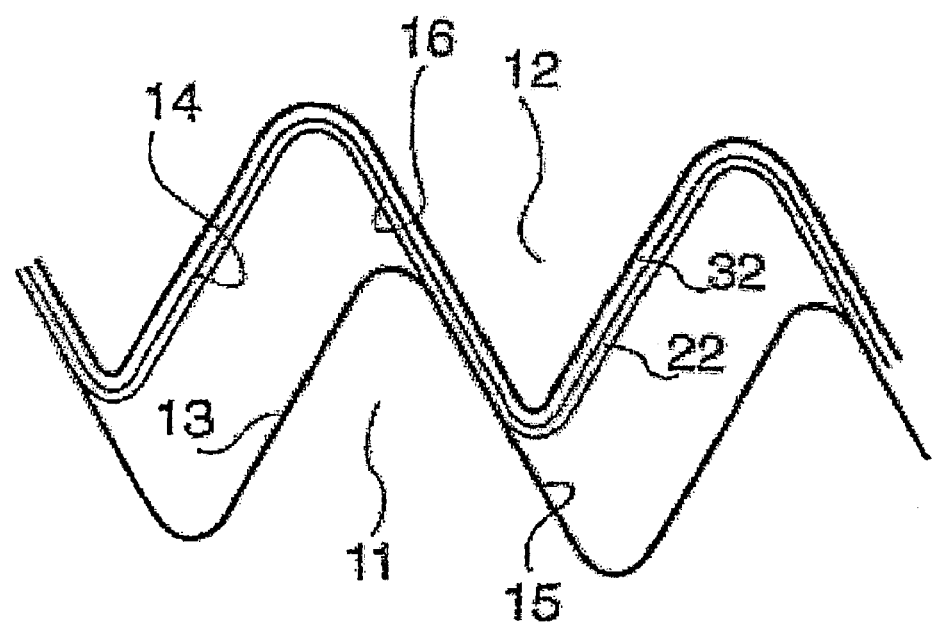
FIG. 7 shows the stabbing phase at the beginning of make up of the male and female threads of FIGS. 4 and 5.

FIG. 7 shows female threads 12 during the stabbing phase during their connection to male threads 11 by makeup.

The layer of lubricating substance 22 prevents direct contact of the as machined male stabbing flanks 15 and female stabbing flanks 16 treated by phosphatation.

Because makeup has only just started and because of the tapered disposition of the threadings, there remains a free space between the layer 22 and the surface of the male thread at the load flanks 13, 14 and the thread crests and roots.

Layer 22 supports the weight of pipe 101 at the stabbing flanks, pipe 101 being made up in the vertical position above coupling 102 already connected to pipe 101' and the high torque provided by the makeup tongs.

Even a slight misalignment of the axes of the male and female threaded elements 1,2 during engagement would, in the absence of any lubricating layer, result in ploughing of the stabbing flank surfaces and very rapid galling of the contacting flanks: it then would be impossible to break out the galled threaded connections and in any event, the deteriorated surfaces of the thread would have to be reconditioned.

The presence of a thickening agent and of oil in the lubricating substance of layer 22 and the viscosity of the lubricating substance ensure that in the presence of shear stresses, there is a self-fed lubrication regime that is typical of an oil or grease. This results in the absence of cracking of the lubricating substance on shear for external operating temperatures in the range −50° C. to +50° C.; it can also be said that the lubricating substance self-heals or self-joins as it is being sheared.

The phosphatation layer 32 on the surface of the female threads 12 can efficiently retain the lubricating substance on the surface of these threads.

Under extreme pressure conditions when self-feeding of the lubricating substance is interrupted locally, the chemical extreme pressure additive takes up the baton for preventing galling.

Figure 8:
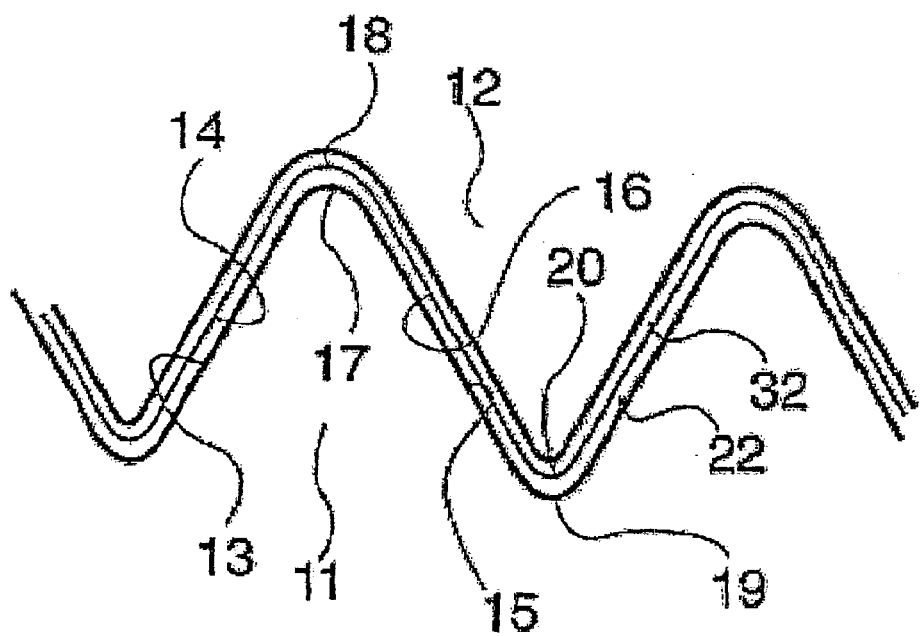
FIG. 8 shows the same male and female elements of FIGS. 4 and 5 once make up is completed.

FIG. 8 shows the male and female threads 11, 12 in the final made up position.

The lubricating substance of the thin layer 22 is distributed in the clearances between the helical surfaces of the threads during makeup. It comes between load flanks 13, 14 and between stabbing flanks 15, 16 and it more or less fills the clearances between thread crests and roots 17, 18, 19, 20 following the pairing due to dimensional tolerances.

For this reason, excess lubricating substance is not ejected into the well and the threaded elements cannot be deformed by the pressures exerted by a great excess of lubricating substance.

Breakout of the connected threads leads to separation of layer 22 into 2 parts, which separation is random in nature within that layer.

Nevertheless the remainders of the layers on the male and female threads can allow at least 10 makeup-breakout cycles to be carried out without the onset of galling.

On the other hand the inventors have noted that simply adding a conventional API 5A2 type grease reduced with respect to the standard quantities required in a manner to simply fill the clearances between the threads rapidly leads to galling after a few makeup/breakout cycles if addition is not renewed between cycles.

FIG. 9 shows a longitudinal section of a few male trapezoidal threads 51 of the male tapered threading 203 of FIG. 2.

Male threads 51 comprise four rectilinear faces, namely:

a load flank 53;

a stabbing flank 55;

a thread crest 57;

a thread root 59.

The thread crests and roots are parallel to the pitch taper of threading 103.

In a variation, not shown, they could be parallel to the axis of the connection, the radial height of the stabbing flank then being greater than that of the load flank.

Load flank 53 makes a slightly negative angle A with the normal to the axis of the threaded element, for example −3°, such that there is a slight overhang.

Stabbing flank 55 makes a positive angle B with the normal to the connection axis such that threads 51 are narrower at their base than at the crest 57, which facilitates machining.

The 4 faces 53, 55, 57, 59 of threads 51 are coated in the as machined state with a deposit 21 that is a few micrometers thick of the same lubricating substance as that formed by deposit 22 in FIG. 5. The same compositions and the same weights of layer can be applied as those described for FIG. 5.

FIG. 10 shows a longitudinal cross section of a few female trapezoidal threads 52 of the female tapered threading 204 of FIG. 2.

Female threads 52 comprise four rectilinear faces with a shape and disposition that correspond to those of the male threads 51, namely:

a load flank 54 with a slightly negative angle A;
a stabbing flank 56 with a positive angle B;
a thread crest 60;
a thread root 58.

Faces 54, 56, 58, 60 are treated by manganese phosphatation in order to produce a 0.006 mm thick phosphatation layer 32, as is the case with FIG. 5.

The thus treated surface of the female threads 52 is coated with a thin layer 22 of the same lubricating substance as that described for FIG. 5.

This lubricating substance is absorbed or adsorbed on the treated surface of threads 52 and covers this surface to a thickness of a few micrometers in a uniform manner. The same compositions and the same weights of layers can be applied as those described in respect of FIG. 5.

As for FIG. 5, manganese phosphatation can be replaced by another surface treatment that is more suitable to the metal of the threaded element in order to produce surfaces that are suitable for adsorbing or absorbing the lubricating substance.

FIG. 11 shows female threads 52 during the stabbing phase when being connected to male threads 51 by makeup.

At the stabbing flanks 55, 56 (see FIG. 12), layers 21, 22 form just one layer 23 whereas they are distinct between the other faces that are not in contact during the stabbing phase.

Layer 23 supports the weight of pipe 201 to be connected, the makeup torque and possibly any side forces if the axis of the male element makes an angle with the axis of the female element.

When makeup is complete (FIG. 13), the lubricating substance substantially fills all the clearances between threads 51, 52 and prevents direct contact between the load flanks 53, 54 under tension and between the female thread crest 60 and the male thread root 59 which radially interfere.

Figure 14:
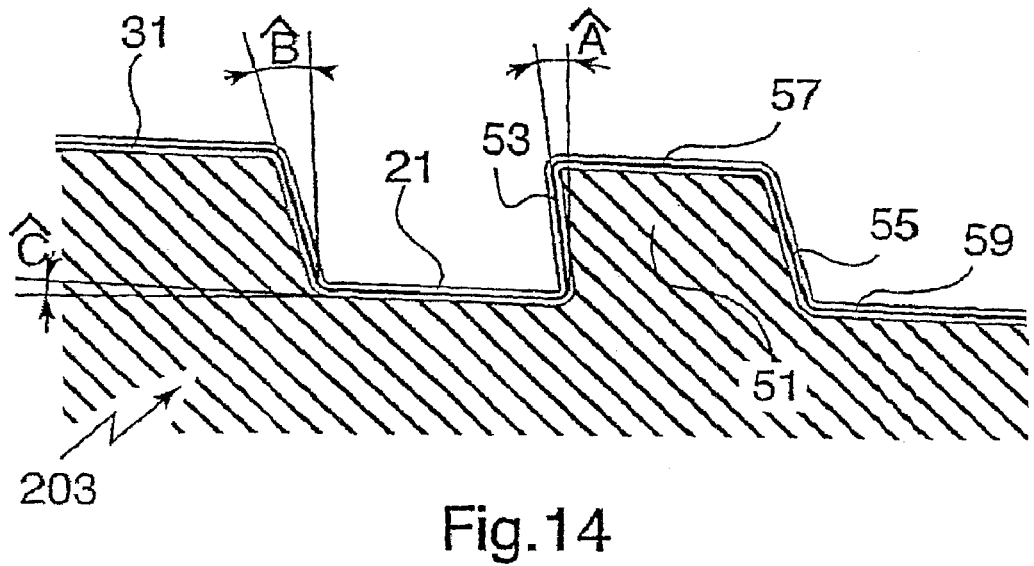
FIG. 14 shows a variation of FIG. 9.

FIG. 14 shows a variation of FIG. 9 in which layer 21 of lubricating substance is not directly produced on the as machined surface of the male threads but on an initially deposited phosphatation layer 31 similar in nature and thickness to that 32 on the surface of the female threads 52 of FIG. 10.

Such a configuration enables to better hold back the lubricating substance on the surface of the male threads and to obtain a connection shown in FIG. 14 with the corresponding female threads of FIG. 10, which connection is particularly suitable for undergoing many makeup-breakout cycles without the risk of galling.

Figure 13:
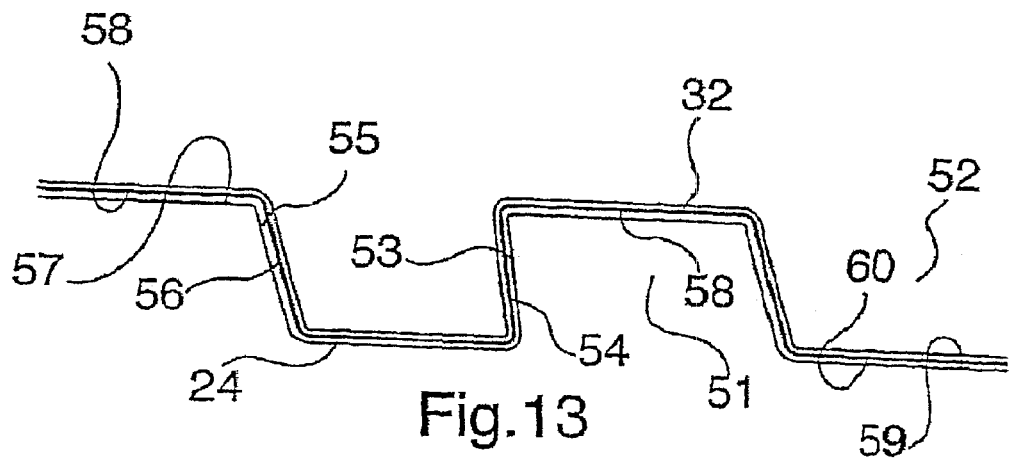
FIG. 13 shows the same male and female elements of FIGS. 9 and 10 once make up is completed.
Figure 15:
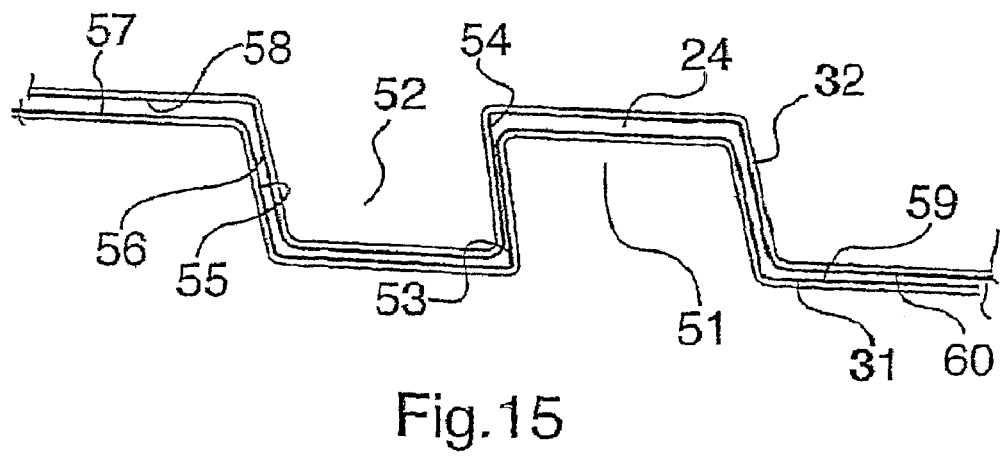
FIG. 15 shows the male and female threads of FIGS. 14 and 10 once make up is completed.

Such a threaded connection of FIG. 15, on the other hand, requires phosphatation both on the coupling 202 and on pipes 101, 101' and thus is more expensive than the connection of FIG. 13.

Figure 16:
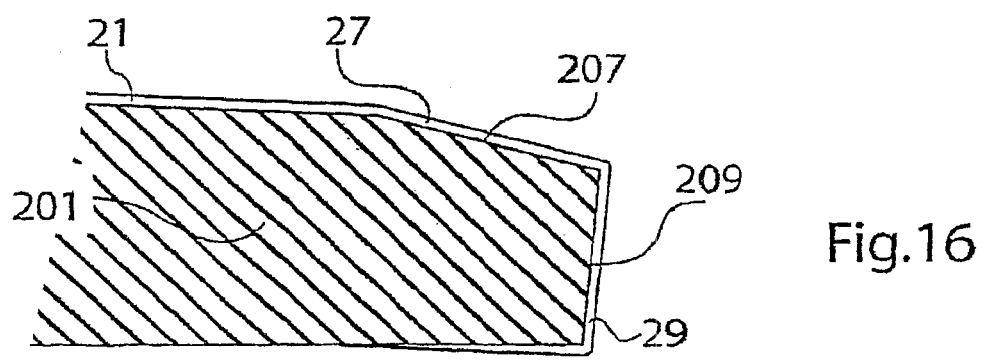
FIG. 16 shows the free end zone of the male element shown in FIG. 2.

FIG. 16 shows the free end zone of pipe 201 and thus of the male threaded element of FIG. 2.

In FIG. 16, layer 21 of the lubricating substance covers not only the surface of male threads 51 of FIG. 9 but also the whole of the external peripheral surface of the male element beyond the threading, and more particularly at 27 the male sealing surface 207 and at 29 the male abutment surface 209 at the end of the pipe. The weight of the layer deposited on surfaces 207, 209 is substantially similar as that deposited on the surface of the male threads.

Figure 17:
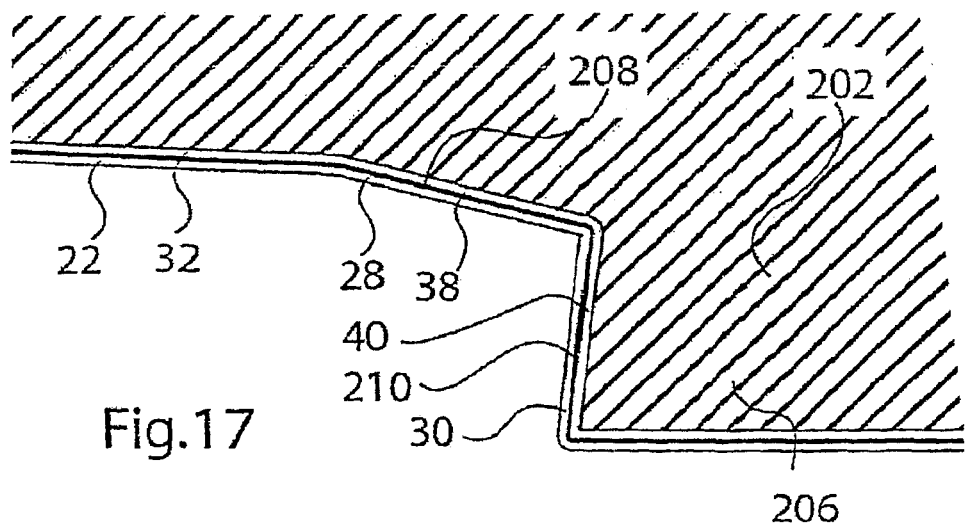
FIG. 17 shows a housing zone inside a female threaded tubular element of the invention shown in FIG. 2.

FIG. 17 shows the female housing zone for the male end of coupling 202 of FIG. 2.

In FIG. 17, the internal surface of the female element between threading 204 and lug 206 is treated in the same manner as the surface of female threads 52 of FIG. 10 by manganese phosphatation (layer 32) and is coated with a layer 22 of lubricating substance, like the surface of those threads 52.

More particularly, layers 32 and 22 coat the female bearing surface 208 at 38 and 28 and the female abutment 210 at 40 and 30.

These layers can readily extend over the internal peripheral surface of the lug 206 and over the external peripheral surface of the coupling 202.

The thickness of the phosphatation layer is substantially identical for the sealing surface 208, the female abutment 210 and the female threads 52.

Similarly, the weight of the layer of lubricating substance is substantially identical for the sealing surface 208, the female abutment 210 and the female threads 52.

Figure 18:
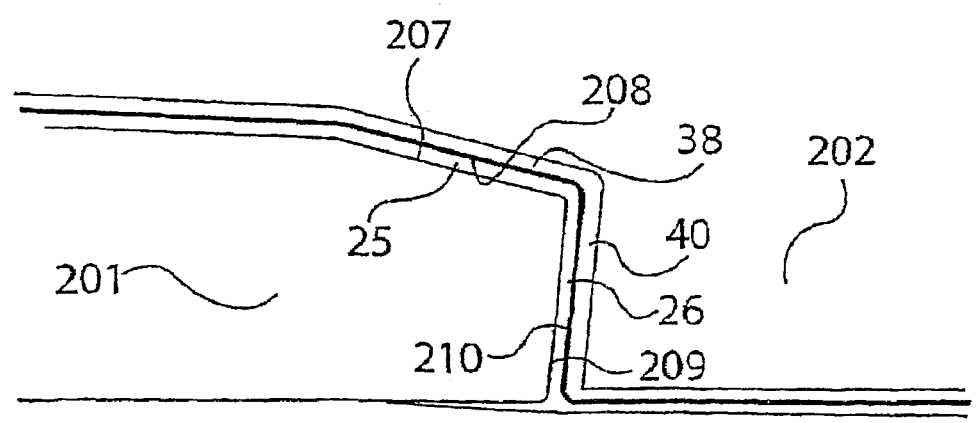
FIG. 18 shows the free end zone of FIG. 16 and the housing zone of FIG. 17 after make up of the threaded elements.

FIG. 18 shows the connection in the made up position of the male free end of FIG. 16 with the corresponding female zone of FIG. 17.

During makeup, the layers of lubricating substances 27, 28 come into contact with each other.

As make up continues, these layers held back by the phosphatation layer 38 prevent direct contact of the metal surfaces of the sealing surfaces and prevent them from galling in particular when surfaces 207, 208 are only slightly inclined and when contact of these surfaces up to the final made up position is produced over a considerable length.

The mechanism for the action of the lubricating substance is the same as that at the thread surfaces.

At the very end of makeup, layers 29, 30 at the level of the abutment surfaces 209, 210 come into contact and prevent these surfaces from galling by the same mechanism.

The phosphatation layer 40 also acts to hold back as much of the film of lubricating substance as possible. Although not shown, one could also think of depositing the lubricating layer at 27 and 29 (male sealing surface and abutment) not directly on the as machined metal surface but on surfaces treated by phosphatation, as is the case in FIG. 17.

It is also easy to apply the teaching of FIGS. 4 to 18 to straight threadings with one or more stages such as those at 303, 303', 304, 304' of the integral threaded connection of FIG. 3 as well as to the abutment and sealing surfaces existing on said connection.

Other implementations that have not been described are also encompassed by the present invention, in particular when the phosphatation layer is produced at the surface of the thread of the male threaded element and not the female threaded element (opposite configuration to that shown for FIGS. 1–18).

The invention is applicable to any male or female threaded element regardless of the disposition of the threading or the threaded portions, to any thread form, to any thread width, which may be constant or may vary along the threading, to interfering or non-interfering threads, with or without contact or interference over the two flanks of the same thread, whether the threaded connection obtained is of a threaded and coupled type or integral type. It is also applicable regardless of the number, form and disposition of the bearing surface and abutment.

We shall now describe non-limiting examples of a method for depositing the lubricating substance in a thin layer on the surface of threads, sealing surfaces and/or abutments to obtain the galling-resistant connections described above.

A liquid mixture is prepared with a viscosity that is measured using a FORD n° 4 cup at 25° C.; some non-limiting examples of the formulation are given below. The numbers for these examples of the liquid mixture formulation respectively correspond to those used in the above examples of the composition of the lubricating substance, the "dry extract" of the lubricating substance corresponding to the liquid mixture of the same example.

EXAMPLE 1

| | |
|---|---|
| special hydrocarbon solvent: | 20% |
| mineral oil: | 47% |
| petroleum paraffin wax: | 15% |
| sulfur-containing product: | 5% |
| overbased sulphonates: | 10% |
| metallic dithiophosphate: | 3% |
| FORD n ° 4 cup viscosity: | 20 s |

EXAMPLE 2

| | |
|---|---|
| special hydrocarbon solvent (white spirit): | 23% |
| mineral oil: | 37% |
| oxidized petrolatum wax: | 22% |
| sulfur-containing product: | 5% |
| overbased sulphonates: | 10% |
| metallic dithiophosphate: | 3% |
| FORD n ° 4 cup viscosity: | 20 s |

EXAMPLE 3

| | |
|---|---|
| special hydrocarbon solvent: | 20% |
| mineral oil: | 37% |
| petrolatum wax: | 25% |
| sulfur-containing product: | 5% |
| overbased sulphonates: | 10% |
| metallic dithiophosphate: | 3% |
| FORD n ° 4 cup viscosity: | 21 s |

EXAMPLE 4

| | |
|---|---|
| special hydrocarbon solvent: | 22% |
| mineral oil: | 37% |
| tackifying petroleum resin: | 23% |
| sulfur-containing product: | 5% |
| overbased sulphonates: | 10% |
| metallic dithiophosphate: | 3% |
| FORD n ° 4 cup viscosity: | 18 s |

EXAMPLE 5

| | |
|---|---|
| special hydrocarbon solvent: | 22% |
| mineral oil: | 37% |
| sulphonated wax: | 23% |
| sulfur-containing product: | 5% |
| overbased sulphonates: | 10% |
| metallic dithiophosphate: | 3% |
| FORD n ° 4 cup viscosity: | 16 s |

EXAMPLE 6

| | |
|---|---|
| special hydrocarbon solvent: | 22% |
| mineral oil: | 37% |
| bitumen: | 23% |
| sulfur-containing product: | 5% |
| overbased sulphonates: | 10% |
| metallic dithiophosphate: | 3% |
| FORD n ° 4 cup viscosity: | 17 s |

EXAMPLE 7

| | |
|---|---|
| special hydrocarbon solvent: | 20% |
| mineral oil: | 39% |
| aluminium stearate: | 23% |
| sulfur-containing product: | 5% |
| overbased sulphonates: | 10% |
| metallic dithiophosphate: | 3% |
| FORD n ° 4 cup viscosity: | 18 s |

EXAMPLE 8

| | |
|---|---|
| special hydrocarbon solvent: | 20% |
| mineral oil: | 54% |
| lipophilic bentonite: | 8% |
| sulfur-containing product: | 5% |
| overbased sulphonates: | 10% |
| metallic dithiophosphate: | 3% |
| FORD n ° 4 cup viscosity: | 17 s |

EXAMPLE 9

| | |
|---|---|
| special hydrocarbon solvent: | 20% |
| mineral oil: | 52% |
| 50% polyalkylmethacrylate: | 10% |
| sulfur-containing product: | 5% |
| overbased sulphonates: | 10% |
| metallic dithiophosphate: | 3% |
| FORD n ° 4 cup viscosity: | 22 s |

EXAMPLE 10

| | |
|---|---|
| special hydrocarbon solvent: | 42% |
| oxidized petrolatum wax: | 23% |
| polyisobutene: | 1% |
| chlorinated paraffin: | 34% |
| FORD n ° 4 cup viscosity: | 20 s |

EXAMPLE 11

| | |
|---|---|
| special hydrocarbon solvent (heptane): | 40% |
| mineral oil: | 7% |
| oxidised petrolatum wax: | 40% |
| sulfur-containing product: | 3% |
| overbased sulphonates: | 7% |
| metallic dithiophosphate: | 3% |
| FORD n ° 4 cup viscosity: | 20 s |

All these liquid mixtures are intimate and stable; thus, they are homogeneous and after eliminating the solvent, produce a homogeneous lubricating substance as defined above.

These liquid mixtures can readily be prepared in advance and stored in closed vessels prior to use. If necessary, the mixture can simply be homogenized prior to use.

The mixture has to be applied in a thin layer to the male and female threaded elements of FIG. 2 with a substantially uniform thickness and more particularly for each of the threaded elements on their threading 203, 204, on the sealing surface 207, 208 and on the abutment 209, 210.

The fact that the organic thickening agents used for the mixtures of Examples 1 to 7 and 9 to 11 contain chemical molecules with a marked polar nature allows the liquid mixture to adhere better to the substrate to be coated.

The content of solvent in the liquid mixtures is of the order of 20% for Examples 1 to 9 and of the order of 40% for Examples 10 and 11. It varies as a function of the consistency of the dry extract obtained after evaporation of the solvent and the nature of the solvent (white spirit, heptane, etc.).

The male threaded elements 1 that are at the end of pipes 201 are placed in the as machined state under a spray head of the type used to phosphate the male threaded elements.

The spray head is supplied at low pressure (1 to 3 bars relative) with the liquid mixture and sprays the liquid mixture over the external surface of the threaded elements.

Because of the low viscosity of the liquid mixture, it distributes itself in a film of uniform thickness over the entire periphery of the threading 203, the sealing surface 207 and the abutment 209.

The thickness of the liquid mixture film is a function of the viscosity of the mixture which is itself a function of the content of oil and volatile solvent: a large content of oil and volatile solvent reduces the viscosity of the mixture and thus the thickness of the liquid film.

The solvent is then evaporated off completely to obtain a layer of lubricating substance with a substantially uniform thickness.

The drying time for the liquid mixture is linked to the evaporation time for the solvent, which is a function of the nature of the solvent (shorter time for heptane than for white spirit, for example) and of the drying temperature.

Female threaded elements 2 to be coated are located inside couplings 202.

Couplings 202 have already undergone, in known manner, a manganese phosphatation treatment which has coated the threading 204, the sealing surface 208 and the abutment 210 of each of the two female threaded elements with a fine phosphate conversion layer about 0.006 mm thick.

Couplings 202 are then individually placed in paint tanks, which contain spray nozzles supplied with the liquid mixture and directed so as to project fine droplets of liquid mixture onto the threading, the sealing surface and the abutment of each female threaded element.

The thickness of the resulting film of liquid mixture is a function of the viscosity of the liquid mixture, the spray pressure, the spray nozzle diameter and the spray duration.

The couplings are then withdrawn from the paint tank and dried by circulating hot air until the solvent has been completely evaporated off.

Each coupling 202 is then made up in the factory in a standard manner using one of its two female threaded elements onto a male threaded element of one of the two ends of pipe 101.

In a known manner, the second female threaded element of the coupling 202 that is not made up and the second male threaded element that is not made up at the other end of pipe 201 are then protected by protectors in order to prevent pollution of these threaded elements by abrasive particles during transport or storage, which can deteriorate the sealing performance during use in a petroleum well.

The applied lubricating substance has hydrophobic and anti-corrosive properties that can protect the threaded elements from corrosion during storage and transport.

If, however, the lubricating substance became polluted, it could be easy to eliminate the layer as if it were a grease, by high water pressure or by petroleum solvent, to apply a new film of liquid mixture, for example using a brush, and to evaporate off the solvent.

Adding colorant to the lubricating substance can facilitate checking these operations of eliminating the layer of polluted lubricating substance and its reconstitution.

Alternatively, standard API type grease can be applied to the threaded element, coated or uncoated or partially uncoated of lubricating substance. The lubricating substance is completely compatible with API type grease.

Such repair procedures are not possible with sliding varnishes.

Figure 19:
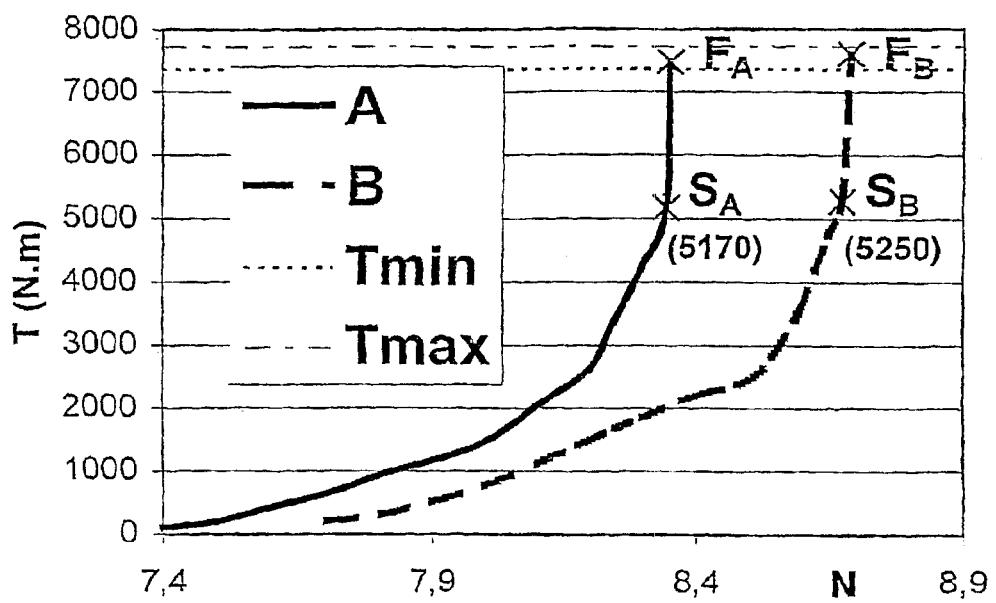
FIG. 19 is a graph representing the makeup curve for a threaded connection of FIGS. 9 to 13 and 16 to 18.

We now show, in FIG. 19, two makeup curves obtained with VAM TOP® threaded connections from the VAM® catalogue, n° 940 edited by the Applicant, with dimensions of 5½"×17 lb/ft (external pipe diameter 139.7 mm and pipe thickness 7.72 mm), of light alloy steel, heat treated, grade L80 (elastic limit of 551 MPa or more).

FIG. 19 shows the makeup torque T up the ordinate as a function of the number of turns N for two tests A and B, curves A and B having been offset along the X axis for easier reading.

Curve A relates to a connection of the invention: the male threaded element is similar to that of FIG. 9 (as machined trapezoidal threads coated with the lubricating substance with the composition of Example 2) and the female threaded element is similar to that of FIG. 10 (trapezoidal threads phosphated with manganese and coated with the same lubricating substance with the composition of Example 2).

Curve B relates to a reference connection lubricated in a standard manner with API 5A2 grease.

In curves A and B, once engagement has occurred between the male and female threaded element, the makeup torque rises steadily because of sliding of the corresponding faces of the threads under contact pressure. The makeup torque increases significantly as the radial interference between the male and female threads resulting from the dimensional characteristics of the threaded connections is high.

Note at a given time the increase in the slope of the makeup curve which shows the appearance of radial interference between the sealing surfaces 207–208. Curves A and B in FIG. 19 are characteristic of threaded connections with high interference between the sealing surfaces.

From point S, the makeup torque increases almost vertically and shows the coming into contact of abutments 209/210.

Point F indicates the final makeup torque, which is located between the minimum makeup torque ($T_{min}$) and the maximum makeup torque ($T_{max}$) specified for this type of threaded connection.

Curve A obtained for a threaded connection of the invention is very similar to that of B obtained for a threaded connection lubricated by an API grease both from its appearance and from the shouldering torque $T_S$ and the final torque $T_F$. This shows that the coefficient of friction of the lubricating substance of the present invention is similar to that of the standard API grease.

For the two curves A and B, the shouldering torque $T_s$ is equal to about 70% of the optimum makeup torque specified for this type of threaded connection because of the particular pairing of the threaded elements tested (high interferences both between the threadings and between the sealing surfaces).

Figure 20:
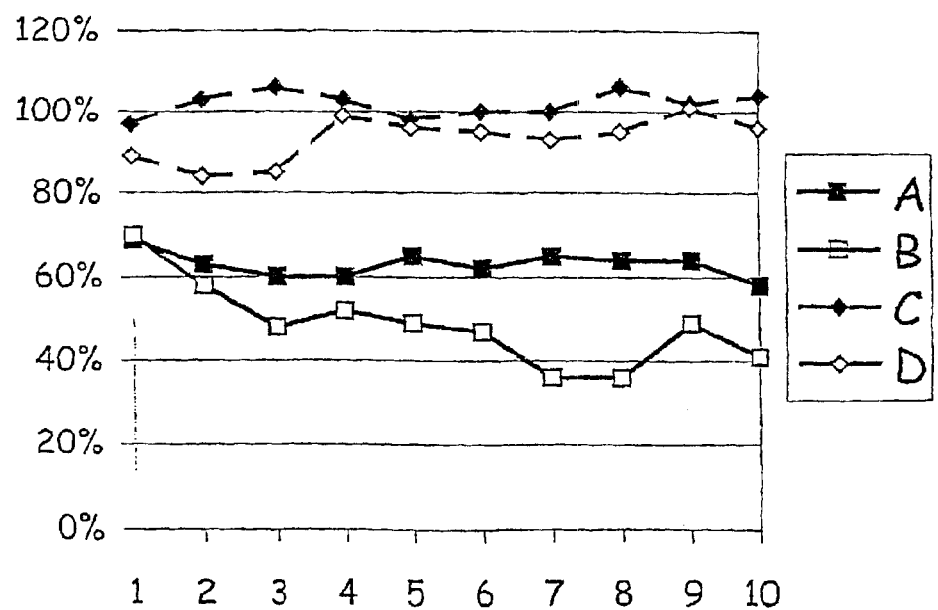
FIG. 20 is a graph representing, for a threaded connection of FIGS. 9 to 13 and 16 to 18, the relative evolution of the shouldering torque during make up and that of the initial breakout torque as a function of the number of makeup-breakout cycles.

Curves A and B in FIG. 20 show, for VAM TOP® threaded connections similar to those of the preceding figure and treated in the same manner, the variation in the shouldering torque as a function of the number of cycles of makeup-breakout carried out (up to 10 cycles), the shouldering torque being expressed by a relative value with respect to the optimum makeup torque, this latter being an average value between the minimum makeup torque and the maximum torque specified.

FIG. 20 shows that the shouldering torque varies little during these 10 makeup-breakout cycles and that the stability of the shouldering torque is better for a threaded connection of the invention (curve A) than for a connection coated with API grease (curve B) even when the coating is renewed between makeup-breakout cycles: the shouldering torque $T_S$ varies from 69% of the optimum makeup torque on the $1^{st}$ makeup to 58% on the $10^{th}$ makeup in the case of curve A compared to 70% on the 1st makeup and 36% on the 6th makeup in the case of curve B. This shows that sufficient lubricating substance remains on a threaded connection of the invention to obtain stable lubricating characteristics both in the threads and in the bearing surfaces after 10 makeup-breakout cycles.

Curves C and D in FIG. 20 show for respectively the same threaded connections as those for curves A and B of FIG. 20, the variation in the initial breakout torque as a function of the number of breakouts for 10 consecutive makeup-breakout cycles, this variation being expressed with respect to the final makeup torque.

The first teaching provided by curve C in FIG. 20 (threaded connection of the invention) is that, because of the absence of galling, the connection can always be broken out.

The initial breakout torque varies for curve C between 97% and 106% of the final makeup torque, again showing stable performances.

In the case of curve D of FIG. 20 (API grease), the initial breakout torque varies between 84% and 101% of the final makeup torque, giving a slightly greater variation than with curve C.

The final visual appearance of the threads and sealing surfaces after 10 makeup-breakout cycles is excellent, with no trace of galling.

The table below compares the number of makeup-breakout cycles obtained before the appearance of galling for a maximum of 10 cycles carried out on the same type of VAM TOP® 5½" 17 lb/ft grade L80 threaded connections as for the tests of FIGS. 19 and 20, but the threaded elements are selected to have low interference between the threadings and high interference between the bearing surfaces.

| | Number of cycles before galling |
|---|---|
| threaded connection with API 5A2 grease (reference) | ≧10 |
| threaded connection with dry $MoS_2$ varnish | 6 |
| threaded connection of present invention with lubricating substance according to Example 2 | ≧10 |

The results confirm that the application of a prior art $MoS_2$ dry varnish rapidly leads to unacceptable galling, while that of the lubricating substance defined above produces satisfactory results comparable, from the point of view of galling, with the results obtained with connections coated with API grease.

What is claimed is:

1. A male or female threaded element for a threaded tubular connection, comprising:
   a respective male or female threading; and
   a lubricating substance deposited prior to make-up of the threaded tubular connection as a thin layer of less than 0.1 mm on at least a surface of threads of the threading, wherein the lubricating substance is a homogeneeus mixture of:
   a) a thickening agent,
   b) at least one extreme pressure additive, and
   c) an oil,
   wherein said at least one extreme pressure additive is a chemical EP additive, and
   wherein said chemical EP additive is capable of use at Hertz pressures of 1000 MPa or more.

2. The threaded element according to claim 1, wherein the chemical EP additive and the thickening agent are soluble in the oil.

3. The threaded element according to claim 1, wherein the thickening agent contains chemical molecules of a marked polar nature.

4. The threaded element according to claim 1, wherein the thickening agent is chemically stable up to a temperature of 120° C. or more.

5. The threaded element according to claim 1, wherein the thickening agent is an organic thickening agent.

6. The threaded element according to claim 1, wherein the thickening agent is a mineral thickening agent.

7. The threaded element according to claim 1, wherein the chemical EP additive is selected from the group consisting of sulfur EP additive, a sulfur-containing chemical EP additive, a phosphorus-containing additive, a sulfur and phosphorus-containing additive, a chlorine-containing EP additive, a modified ester-containing additive, a non modified ester-containing additive, a modified fatty acid-containing additive and a complex ester-containing additive.

8. The threaded element according to claim 1, wherein the thickening agent is an oxidized petrolatum wax, wherein a plurality of chemical EP additives is present, comprising a sulfur-containing product, an overbased sulphonate and a metallic dithiophosphate, and wherein the oil is a mineral oil.

9. The threaded element according to claim 1, wherein the lubricating substance comprises at least one EP additive with a physical action in the form of solid sub-micronic particles.

10. The threaded element according to claim 1, wherein the at least one EP additive has anti-corrosion properties.

11. The threaded element according to claim 1, wherein the total content of EP additives in the lubricating substance is in the range 5% to 50% by weight, and wherein the EP additives include a plurality of chemical EP additives.

12. The threaded element according to claim 11, wherein the content of thickening agent in the lubricating substance is in the range 5% to 60% by weight, and wherein the content of oil in the lubricating substance is in the range 30% to 75% by weight.

13. The threaded element according to claim 11, wherein the content of thickening agent in the lubricating substance is in the range 60% to 80% by weight, and wherein the content of oil in the lubricating substance is in the range 5% to 20% by weight.

14. The threaded element according to claim 1, wherein the chemical EP additive comprises a chlorinated paraffin, the content of thickening agent in the lubricating substance is in the range 25% to 60% by weight, wherein the total content of EP additives in the lubricating substance is in the range 40% to 75% by weight, and wherein the content of oil in the lubricating substance is in the range 0.5% to 15% by weight.

15. The threaded element according to claim 1, wherein the weight of the layer of lubricating substance is in the range 0.1 g/m$^2$ to 40 g/m$^2$.

16. The threaded element according to claim 1, wherein said surface of the threads is treated to adsorb or absorb the lubricating substance and is the surface of a layer selected from the group consisting of phosphatation layers, oxalation layers and metallic layers.

17. The threaded element according to claim 1, wherein the surface of the threads is treated to endow said surface with a controlled roughness so as to adsorb or absorb the lubricating substance.

18. The threaded element according claim 16, wherein the surface of the threads is treated to adsorb or absorb the lubricating substance over a depth in the range 0.003 mm to 0.080 mm.

19. The threaded element according to claim 1, wherein the threaded element further comprises at least one sealing surface, the lubricating substance being also deposited as a thin layer on said sealing surface.

20. The threaded element according to claim 1, wherein the threaded element further comprises at least one makeup abutment, the lubricating substance being also deposited as a thin layer on each surface of the abutment.

21. The threaded element according to claim 19, wherein all of the surfaces on which the lubricating substance is deposited as a thin layer are surfaces that are treated to adsorb or absorb the lubricating substance.

22. The threaded element according to claim 1, wherein the lubricating substance comprises less than 5% by weight of a colorant that is inactive with respect to galling-resistant properties of the tubular connection.

23. A threaded tubular connection comprising a male threaded element and a female threaded element, each of said threaded elements comprising a corresponding threading, said threadings being made up one into the other to a connected position, wherein at least one of the two threaded elements is a threaded element according to claim 1.

24. The threaded tubular connection according to claim 23, wherein both threaded elements are elements according to claim 1, and only one of the threaded element has a surface treated to adsorb or absorb said lubricating substance.

25. A method for preparing a threaded tubular connection between a male threading and a female threading, the method comprising the steps of
a) preparing a homogeneous liquid mixture comprising
a volatile solvent;
a thickening agent;
at least one extreme pressure additive and
an oil;
b) prior to making-up said tubular connection, applying a thin layer of said liquid mixture of substantially uniform thickness to a surface of threads of at least one of said male and female threadings; and
c) evaporating the volatile solvent thereby obtaining prior to make-up a thin layer of less than 0.1 mm of a lubricating substance on said surface of said threads,
wherein said at least one extreme pressure additive is a chemical EP additive, and
wherein said chemical EP additive is capable of use at Hertz measures of 1000 MPa or more.

26. The threaded element according to claim 4, wherein the thickening agent is chemically stable up to a temperature of 160° C. or more.

27. The threaded element according to claim 11, wherein the total content of EP additives in the lubricating substance is in the range of from 15% to 32% by weight.

28. The threaded element according to claim 12, wherein the content of thickening agent in the lubricating substance is in the range of from 8% to 40% by weight.

29. The method of claim 25, further comprising the step of treating said surface of the threads to absorb or adsorb the lubricating substance prior to said step of applying said thin layer of said liquid mixture.

30. The threaded element according to claim 1, wherein said surface is treated to adsorb or absorb said lubricating substance.

31. The threaded element according to claim 1, wherein proportions of constituents of the lubricating substance are selected so that said lubricating substance has a consistency that ensures a self-fed lubrication regime and a film-forming nature.

32. The threaded element according to claim 1, wherein said lubricating substance is free of any non-chemical EP additive.

33. The threaded element according to claim 1, wherein said lubricating substance is free of any heavy metals.

34. The threaded element according to claim 33, wherein said lubricating substance is free of any toxic compound of said heavy metals.

35. The threaded element according to claim 33, wherein said lubricating substance is free of Zn.

36. The threaded element according to claim 33, wherein said lubricating substance is free of Cu.

37. The threaded element according to claim 33, wherein said lubricating substance is free of Pb.

38. The threaded element according to claim 1, wherein said lubricating substance comprises three different chemical EP additives.

39. The threaded element according to claim 38, wherein said lubricating substance consists essentially of said thickening agent, said three chemical EP additives and said oil.

40. The threaded element according to claim 38, wherein said three different chemical EP additives are a sulfur-containing product, a sulphonate, and a dithiophosphate.

41. The threaded element according to claim 39, wherein said lubricating substance is free of any additional substance affecting the galling-resistant properties of the tubular connection.

42. The threaded tubular connection according to claim 23, wherein said connection is resistant to galling.

43. The method according to claim 25, wherein said step of applying said thin layer of said liquid mixture comprises spraying said liquid mixture over said surface of threads prior to make-up.

* * * * *

UNITED STATES PATENT AND TRADEMARK OFFICE
CERTIFICATE OF CORRECTION

PATENT NO. : 6,933,264 B2
DATED : August 23, 2005
INVENTOR(S) : Petelot et al.

It is certified that error appears in the above-identified patent and that said Letters Patent is hereby corrected as shown below:

Title page,
Item [75], Inventors, after "Daniel Petelot, Taisnieres en Thierache (FR)" insert
-- Lionel Verdillon, Dommartin (FR)
Nguyen Truong Dinh, Taluyers (FR)
Regis Bertet, Lyon (FR)
Francois Chambellant, Villeurbanne (FR) --.

Signed and Sealed this

Twenty-first Day of February, 2006

JON W. DUDAS
*Director of the United States Patent and Trademark Office*